(12) United States Patent
Niskanen et al.

(10) Patent No.: US 9,219,605 B2
(45) Date of Patent: Dec. 22, 2015

(54) QUANTUM KEY DISTRIBUTION

(75) Inventors: Antti Niskanen, Cambridge (GB); Li Hongwei, Cambridge (GB); Anthony Laing, Bristol (GB); Mirko Lobino, Bristol (GB); Mark Thompson, Bristol (GB); Jeremy O'Brien, Bristol (GB)

(73) Assignee: Nokia Technologies Oy, Espoo (FI)

( * ) Notice: Subject to any disclaimer, the term of this patent is extended or adjusted under 35 U.S.C. 154(b) by 437 days.

(21) Appl. No.: 13/019,549

(22) Filed: Feb. 2, 2011

(65) Prior Publication Data

US 2012/0195430 A1  Aug. 2, 2012

(51) Int. Cl.
*H04K 1/00* (2006.01)
*H04L 9/08* (2006.01)

(52) U.S. Cl.
CPC ................................. *H04L 9/0852* (2013.01)

(58) Field of Classification Search
None
See application file for complete search history.

(56) References Cited

U.S. PATENT DOCUMENTS

| | | | | |
|---|---|---|---|---|
| 5,307,410 A * | 4/1994 | Bennett | .......................... | 380/256 |
| 5,764,765 A * | 6/1998 | Phoenix | ................ | H04L 9/0858 380/256 |
| 6,289,104 B1 * | 9/2001 | Patterson et al. | ............. | 380/283 |
| 6,801,626 B1 * | 10/2004 | Nambu | .......................... | 380/255 |
| 7,266,304 B2 * | 9/2007 | Duraffourg | ........... | H04L 9/0852 380/256 |
| 8,683,192 B2 * | 3/2014 | Ayling et al. | ................. | 713/153 |
| 2001/0055389 A1 * | 12/2001 | Hughes et al. | .................. | 380/44 |
| 2004/0184615 A1 | 9/2004 | Elliott et al. | .................. | 380/283 |
| 2005/0078826 A1 * | 4/2005 | Takeuchi | ...................... | 380/255 |
| 2005/0135620 A1 * | 6/2005 | Kastella et al. | ............... | 380/256 |
| 2006/0263096 A1 * | 11/2006 | Dinu et al. | ..................... | 398/187 |
| 2006/0290941 A1 | 12/2006 | Kesler et al. | .................. | 356/491 |
| 2007/0016534 A1 | 1/2007 | Harrison et al. | ................ | 705/65 |
| 2007/0025551 A1 * | 2/2007 | Harrison et al. | ............ | 380/256 |
| 2007/0076884 A1 * | 4/2007 | Wellbrock et al. | ............ | 380/263 |
| 2007/0133798 A1 * | 6/2007 | Elliott | ........................ | 380/255 |
| 2007/0140495 A1 * | 6/2007 | Berzanskis et al. | ........... | 380/278 |
| 2008/0152147 A1 | 6/2008 | Xia et al. | ...................... | 380/279 |
| 2008/0198437 A1 * | 8/2008 | Shapiro et al. | ................ | 359/238 |
| 2009/0310784 A1 | 12/2009 | Duligall et al. | ............... | 380/256 |
| 2010/0008039 A1 | 1/2010 | Shen et al. | ............... | 361/679.55 |
| 2010/0080394 A1 * | 4/2010 | Harrison et al. | .............. | 380/278 |

(Continued)

FOREIGN PATENT DOCUMENTS

WO  WO-2009/141587 A1  11/2009
WO  WO-2012044852 A1   4/2010

(Continued)

OTHER PUBLICATIONS

"The security of practical quantum key distribution", Reviews of Modern Physics, 2009, vol. 81, No. 3, by Scarani, V et al.
"High-fidelity transmission of polarization encoded qubits from an entangled source over 100 km of fiber", Opt. Express, Jun. 11, 2007, vol. 15, No. 12, by Hübel, H et al.

(Continued)

*Primary Examiner* — Jason K. Gee
*Assistant Examiner* — Olanrewaju Bucknor
(74) *Attorney, Agent, or Firm* — Harrington & Smith

(57) ABSTRACT

An apparatus including: an input optical interface configured to receive a series of optical input signals each including photons; an encoder configured to encode a quantum key for distribution by encoding each of the series of received optical input signals with a measurable state; an attenuator configured to attenuate each of the encoded optical input signals to create a series of quantum optical signals; and an output optical interface configured to send the series of quantum optical signals to the remote apparatus via a quantum communication channel.

19 Claims, 2 Drawing Sheets

(56) References Cited

U.S. PATENT DOCUMENTS

| | | | |
|---|---|---|---|
| 2010/0299526 A1* | 11/2010 | Wiseman et al. | 713/171 |
| 2011/0069972 A1* | 3/2011 | Wiseman et al. | 398/186 |
| 2011/0280405 A1* | 11/2011 | Habif | 380/278 |
| 2012/0195428 A1* | 8/2012 | Wellbrock et al. | 380/255 |
| 2014/0098955 A1* | 4/2014 | Hughes et al. | 380/256 |

FOREIGN PATENT DOCUMENTS

| | | |
|---|---|---|
| WO | WO-2011039503 A2 | 4/2011 |
| WO | WO-2011094520 A2 | 8/2011 |

OTHER PUBLICATIONS

"Reference frame independent quantum key distribution", Anthony Laing et al., Centre for Quantum Photonics, Mar. 4, 2010, 5 pgs.

"Reference frame independent quantum key distribution", Anthony Laing et al., Phys. Rev. A, 82, 12304, Mar. 2010, 5 pgs.

"Low cost and compact quantum key distribution", Duligall et al., New J. Phys., 8,249, 2006, 11 pgs.

"Single-photon interference experiment over 100 km for quantum cryptography system using a balanced gated-mode photon detector", Hideo Kosaka et al., IEEE, Aug. 2003, 11 pgs.

"ESTI QKD ISG", ETSI World Class Standards, http://www.etsi.org/WebSite/Technologies/QKD.aspx, Mar. 22, 2011, 1 pg.

* cited by examiner

QUANTUM KEY DISTRIBUTION

TECHNOLOGICAL FIELD

Embodiments of the present invention relate to quantum key distribution. In particular, they relate to quantum key distribution that is suitable for mobile apparatus.

BACKGROUND

Photon polarization states may be used to transmit securely a randomly generated key using quantum key distribution (QKD).

In one type of QKD, the sender (Alice) and the receiver (Bob) are connected by a quantum communication channel which allows quantum states to be transmitted. In addition they communicate via a classical channel.

Information sent from Alice to Bob is encoded in non-orthogonal states. Quantum indeterminacy means that these states cannot in general be measured by an eavesdropper (Eve) without disturbing the original state.

One QKD protocol uses two bases. A basis is defined by a pair of orthogonal states. Each basis is conjugate to the other base.

The usual polarization state pairs used are either the rectilinear basis of vertical (0°) and horizontal (90°), the diagonal basis of 45° and 135° or the circular basis of left- and right-handedness. Any two of these bases are conjugate to each other, and so any two can be used in the protocol Alice creates a random bit (0 or 1) and then randomly selects one of her two bases (e.g. rectilinear or diagonal) to transmit it in. She then prepares a photon polarization state depending both on the information bit value and the selected basis. Alice then transmits to Bob a single photon in the state specified, using the quantum channel. This random bit creation and transmission is repeated to transmit all the information.

Bob does not know the basis the photons were encoded in. Bob selects a basis at random from the pair of bases used for encoding and uses it to measure the transmitted photon. He does this for each photon he receives, recording the time, measurement basis used and measurement result.

After Bob has measured all the photons, he communicates with Alice over the classical channel. Alice tells Bob the basis each photon was transmitted in, and Bob tells Alice the basis each photon was measured in. They both discard photon measurements (bits) where Bob used a different basis.

To check for the presence of eavesdropping Alice and Bob now compare a certain subset of their remaining bit strings. If Eve has measured any of the photons' polarizations, errors are introduced into Bobs' measurements. If the errors are less than a threshold then the quantum channel may be considered secure.

A modification to this protocol is described in "Reference frame independent quantum key distribution" by Laing et al, 4 Mar. 2010, Phys Rev A 82, 012304. This paper describes a theoretical frame independent quantum key distribution scheme.

The sender (Alice) and the receiver (Bob) are notionally connected by a free space quantum communication channel which allows quantum states to be transmitted. In addition they communicate via a classical channel.

This protocol uses three bases. A basis is defined by a pair of orthogonal states. Each basis is conjugate to the other bases.

The usual polarization bases used are the rectilinear basis of vertical (0°) and horizontal (90°), the diagonal basis of 45° and 135° and the circular basis of left- and right-handedness.

Alice creates a random bit (0 or 1) and then randomly selects one of her three bases (e.g. rectilinear, diagonal, circular) to transmit it in. She then prepares a photon polarization state depending both on the bit value and the selected basis. Alice then transmits to Bob a single photon in the state specified, using the quantum channel. This random bit creation and transmission is repeated.

Bob does not know the basis the photons were encoded in. Bob selects a basis at random from the three bases used for encoding and uses it to measure the transmitted photon. He does this for each photon he receives, recording the time, measurement basis used and measurement result.

After Bob has measured all the photons, he communicates with Alice over the classical channel. Alice tells Bob the basis each photon was sent in, and Bob tells Alice the basis each was measured in.

They both define photon measurements (bits) as either 'matched' or unmatched'. Matching occurs when Alice and Bob have used the same basis for the same bit.

One of the three bases, the circular basis, is considered to be invariant and unaffected by relative movement of Bob and Alice.

Alice and Bob share as common knowledge which basis is the 'invariant' basis. They both use the matched bits that were measured using the invariant basis and use them as a shared key (raw key). The other bits sent/measured using the non-invariant bases may be used to calculate a statistical expression to estimate Eve's information.

BRIEF SUMMARY

According to various, but not necessarily all, embodiments of the invention there is provided an apparatus comprising: an input optical interface configured to received a series of optical input signals each comprising photons; an encoder configured to encode a quantum key for distribution by encoding each of the series of received optical input signals with a measurable state; an attenuator configured to attenuate each of the encoded optical input signals to create a series of quantum optical signals; and an output optical interface configured to send the series of quantum optical signals to the remote apparatus via a quantum communication channel.

This provides the advantage that the apparatus (Alice) does not need to comprise equipment for generating the optical signals that are encoded by Alice. That is Alice is 'lean'.

According to various, but not necessarily all, embodiments of the invention there is provided an apparatus comprising: means for receiving optical input signals comprising photons; means for encoding a state of the optical input signal; means for attenuating the encoded optical input signal to create a quantum output optical signal; and means for transferring the quantum output signal to a remote apparatus.

According to various, but not necessarily all, embodiments of the invention there is provided an apparatus comprising: an encoder configured to encode a quantum key for distribution by encoding each of the series of received optical input signals with a measurable state; an attenuator configured to attenuate each of the encoded optical input signals to create a series of quantum optical signals; and an output optical interface configured to send the series of quantum optical signals to the remote apparatus via a quantum communication channel.

According to various, but not necessarily all, embodiments of the invention there is provided a method comprising:

receiving a series of optical input signals each comprising photons; encoding a quantum key for distribution by encoding each of the series of received optical input signals with a measurable state; attenuating each of the encoded optical input signals to create a series of quantum optical signals; and transferring the series of quantum optical signals to a remote apparatus via a quantum communication channel.

According to various, but not necessarily all, embodiments of the invention there is provided an apparatus comprising: a coherent light source; an intensity modulator configured to receive an output from the coherent light source and produce a series of optical signals; an interface configured to receive the series of optical signals without modification by a quantum state encoder and provide the series of optical signals to an apparatus via an optical fiber; and circuitry configured to measure states of quantum encoded optical signals received in response to the series of optical signals via a quantum communications channel from the apparatus.

BRIEF DESCRIPTION

For a better understanding of various examples of embodiments of the present invention reference will now be made by way of example only to the accompanying drawings in which.

DETAILED DESCRIPTION

A brief overview of one embodiment of the invention will be described with reference to a sender (Alice) and a receiver (Bob).

Alice and Bob are connected by a quantum communication channel which allows quantum states to be transmitted. In addition they communicate via a classical communications channel.

Alice and Bob both use a common quantum key distribution protocol. The protocol uses N bases where N>2. A basis is defined by a pair of orthogonal states. Each basis is conjugate to the other bases.

The following description of this embodiment uses three polarization bases. The polarization bases used, in this example, are the rectilinear basis of vertical (0°) and horizontal (90°), the diagonal basis of 45° and 135° and the circular basis of left- and right-handedness.

Alice creates a random bit (0 or 1) and then randomly selects one of her three bases (e.g. rectilinear, diagonal, circular) to transmit it in.

She then prepares a photon polarization state depending both on the bit value and the selected basis. Alice then transmits to Bob a single photon in the state specified, using the quantum channel. This random bit creation and transmission is repeated M times.

Bob does not know the basis the photons were encoded in. Bob selects a basis at random from the three bases used for encoding and uses the selected basis to measure the transmitted photon. He does this for each photon he receives, recording the time, measurement basis used and measurement result.

After Bob has measured all the M photons, he communicates with Alice over the classical channel. Alice tells Bob the basis each photon was sent in, and Bob tells Alice the basis each was measured in.

They both define photon measurements (bits) as either 'matched' or unmatched'. Matching occurs when Alice and Bob have used the same basis for the same bit.

One of the three basis, e.g. the rectilinear basis, is considered to be invariant and unaffected by relative movement of Bob and Alice.

Alice and Bob share as common knowledge which basis is the 'invariant' basis. They both use the matched bits that were measured using the invariant basis as a shared quantum key. The other bits sent/measured in the other bases may be used to calculate a statistical expression to estimate a notional eavesdropper's information.

For example, if $Z_A$ represents the set of states sent by Alice (A) using the invariant basis and $Z_B$ represents the set of states measured at Bob (B) using the invariant basis, if $X_A$ represents the set of states sent by Alice (A) using the one of the other non-invariant basis and $X_B$ represents the set of states measured at Bob (B) using the same other non-invariant basis, if $Y_A$ represents the set of states sent by Alice (A) using the other non-invariant basis and $Y_B$ represents the set of states measured at Bob (B) using the same other non-invariant basis, then $$C = <X_A X_B>^2 + <X_A Y_B>^2 + <Y_A X_B>^2 + <Y_A Y_B>^2$$

Figure 1:
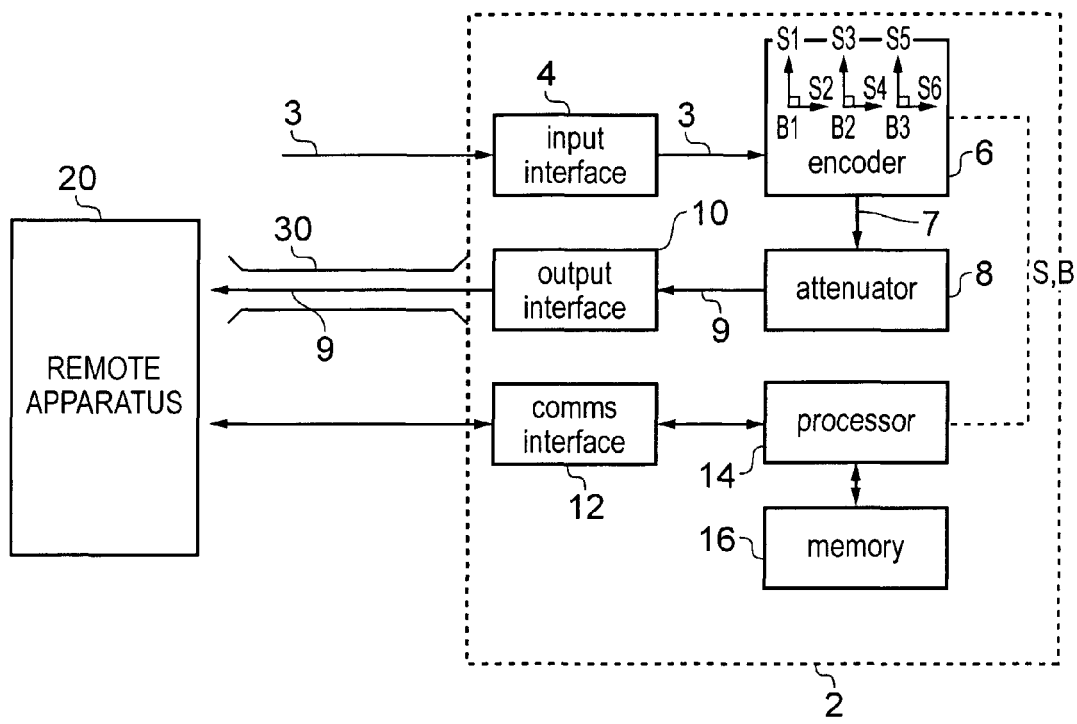
FIG. 1 illustrates an example of apparatus that distributes a quantum key to a remote apparatus.

FIG. 1 schematically illustrates an apparatus 2. This apparatus is suitable for use by Alice.

This apparatus 2 does not generate the photon that is encoded with the selected state but receives photons from an external source. The apparatus 2 consequently requires less expensive components.

The apparatus 2, in this example, is not suitable for use as Bob.

The apparatus 2 is consequently suitable for use in an asymmetric quantum key distribution system in which specific apparatuses are used as Alice and one or more specific apparatus is used as Bob.

FIG. 1 illustrates an apparatus 2 comprising: an input optical interface 4 configured to received a series of optical input signals 3 each comprising photons; an encoder 6 configured to encode a quantum key for distribution by encoding each of the series of received optical input signals 3 with a measurable state S; an attenuator 8 configured to attenuate the encoded optical input signals 7 to create a series of quantum optical signals 9; and an output optical interface 10 configured to send the series of quantum optical signals 9 to a remote apparatus 20 (Bob) via a quantum communication channel 30.

The encoder 6 is configured to randomly select one of a plurality of conjugate bases $B_n$, each of which defines two orthogonal states $S_m$.

The encoder 6 is configured then to randomly select one of the two orthogonal states S of the selected conjugate base B. This selection between states encodes information bits, some of which will be used in a shared quantum key.

The encoder 6 is configured to encode an optical input signal 3 with the selected state S.

The attenuator 8 is configured to attenuate the encoded optical input signals 7 output by the encoder 6 such that its output, the quantum output optical signal 9, probabilistically comprises a single photon.

The output optical interface 10 is configured to transfer the series of quantum optical signals 9 to the remote apparatus 20 (Bob) via a quantum communication channel 30.

The apparatus 2 further comprises a communication interface 12 for communication with the remote apparatus 20.

This communication interface 12 may be any suitable interface such as a radio transceiver, modem, network interface or similar.

The communications interface 12 is configured to transfer information to the remote apparatus 20 that identifies a basis B used for each of the states S of the series of quantum optical signals 9.

The communications interface 12 is configured to receive information from the remote apparatus 20 that identifies a basis B used to measure a state of each of the series of quantum optical signals 9.

The apparatus 2 further comprises a processor 14 configured to identify a match when a common basis is used for creating, at the apparatus 2, a quantum optical output signal 9 and for measuring, at the remote apparatus 20, a state of the created quantum optical output signal. That is when the apparatus and the remote apparatus use the same common basis for encoding the quantum optical output signal 9 and for measuring, at the remote apparatus 20, that particular quantum optical output signal 9.

The processor 14 is configured, when there is a match, to record in memory 16, as an information bit, the state S of the common basis used to encode that matched quantum optical output signal 9.

The processor 14 is configured, to use the recorded information bits to determine a shared quantum key.

The remote apparatus 20 is also configured to identify a match when a common basis is used for creating, at the apparatus 2, a quantum optical output signal and for measuring, at the remote apparatus 20, the created quantum optical output signal 9. When there is a match the state S of the common basis used to measure that matched quantum optical output signal 9 is recorded as an information bit which is then used to determine the shared quantum key.

In this way a quantum key is distributed from apparatus 2 (Alice) to the remote apparatus 20 (Bob).

The output optical interface 10 may be configured to release the quantum communication channel 30 after quantum key distribution.

The apparatus 2 may be a mobile apparatus such as a mobile computer e.g. a lap-top or tablet computer or may be a hand-portable personal electronic device, that is sized to fit in a shirt pocket such as a cellular telephone or similar.

The shared quantum key may be securely stored in a tamper-proof repository until it is needed, for example, for message encryption. Summing the quantum key with a message bitwise (modulo 2) produces an encrypted message.

Figure 2:
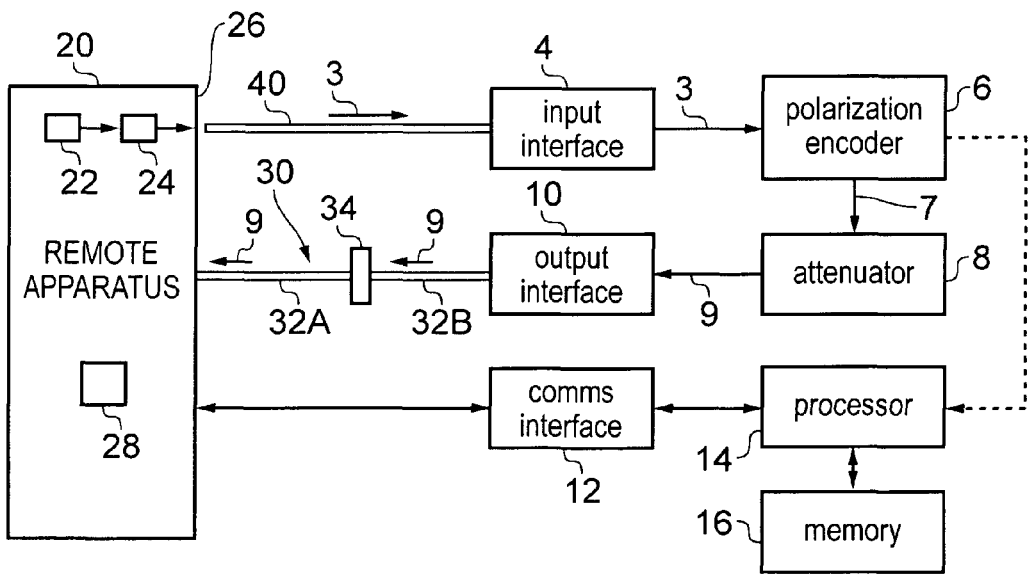
FIG. 2 illustrates another example of an apparatus that distributes a quantum key to a remote apparatus.

FIG. 2 illustrates an apparatus 2, similar to that illustrated in FIG. 1, comprising: an input optical interface 4 configured to received a series of optical input signals 3 each comprising photons; an encoder 6 configured to encode a quantum key for distribution by encoding each of the series of received optical input signals 3 with a measurable state S; an attenuator 8 configured to attenuate the encoded optical input signals 7 to create a series of quantum optical signals 9; and an output optical interface 10 configured to send the series of quantum optical signals 9 to a remote apparatus 20 (Bob) via a quantum communication channel 30.

In this embodiment, the series of optical input signals 3 is received at the input optical interface 4 from the remote apparatus 20. The series of optical signals 3 is received via a polarization preserving optical fiber 40.

The remote apparatus 20 comprises the apparatus necessary to generate the series of optical input signals 3. The optical signals are preferably pulses of coherent light which may be provided by a laser pulse source. The pulses comprise a plurality of photons and are not single photon level pulses.

The laser pulse source may comprise a continuous wave laser 22 and an intensity modulator 24. The laser 22 may operate, for example, at 1550 nm. The intensity modulator 24 may be a Mach-Zehnder Interferometer (MZI) based chopper.

The pulses may be used as a common clock between the remote apparatus 20 and the apparatus 2.

The encoder 6 is a polarization encoder that is configured to encode a polarization state S of the optical input signal 3. The polarization encoder 6 may be made from lithium niobate.

A polarization state S, in this example, is a state defined according to one of the following bases B: the rectilinear basis of vertical (0°) and horizontal (90°), the diagonal basis of 45° and 135° and the circular basis of left- and right-handedness.

The polarization encoder 6 is configured to randomly select one of a plurality of conjugate polarization bases B, each of which defines two orthogonal states S. The polarization encoder 6 is configured then to randomly select one of the two orthogonal states S of the selected conjugate base B. This selection between states encodes information bits, some of which will be used in a shared quantum key. The polarization encoder 6 is configured to encode an optical input signal 3 with the selected state S.

The attenuator 8 is configured to attenuate the encoded optical input signals 7 output by the polarization encoder 6 such that its output, the quantum output optical signal 9, probabilistically comprises a single photon.

The output optical interface 10 is configured to transfer the series of quantum optical signals 9 to the remote apparatus 20 (Bob) via a quantum communication channel 30.

In this embodiment, the quantum communication channel 30 is associated with at least one basis B that is invariant. The quantum communication channel preserves states of an invariant basis.

The state S of the optical input signal 3 is encoded by the polarization encoder 6 using any one of a plurality of bases B including the one or more invariant bases.

The quantum communications channel may be a polarization maintaining optical fiber 32 that comprises equal lengths of optical fiber 32A, 32B having orthogonal fast axes. The N optical fibers 32A, 32B are rotated relative to each other by 90 degrees around the core of the fiber at the N−1 interfaces 34 joining the fibers. This preserves the coherence between the polarization along the fast and slow axes in the first order.

The apparatus 2 further comprises a communication interface 12 for communication with the remote apparatus 20. This communication interface 12 may be any suitable interface such as a radio transceiver, modem, network interface or similar.

The communications interface 12 is configured to transfer information to the remote apparatus 20 that identifies a basis B for each of the states S of the series of quantum optical signals 9.

The communications interface 12 is configured to receive information from the remote apparatus 20 that identifies a basis B used to measure each of the states of the series of quantum optical signals 9.

The apparatus 2 further comprises a processor 14 configured to identify a match when a common basis B is used for creating, at the apparatus 2, a quantum optical output signal 9 and for measuring, at the remote apparatus 20, the created quantum optical output signal 9. That is when the apparatus 2 and the remote apparatus 20 use the same common basis B for encoding the quantum optical output signal 9 and for measuring, at the remote apparatus 20, that particular quantum optical output signal 9.

The processor 14 is additionally configured to identify when a match is an invariant match. An invariant match occurs when a common invariant basis is used for creating, at the apparatus 2, a quantum optical output signal 9 and for measuring, at the remote apparatus 20, the created quantum optical output signal.

In this embodiment, an example of an invariant basis is the rectilinear basis.

The processor 14 is configured, when there is an invariant match, to record in memory 16, as a first information bit, the state S of the common invariant basis used to encode that matched quantum optical output signal 9.

The first information bits are the bits of a distributed shared quantum key.

The processor 14 is configured, to record in memory 16, as a second information bits, the state S of the non-invariant bases used to encode the quantum optical output signals 9.

The second information bits are used by the processor to calculate a statistical expression that estimates security.

For example, if $Z_A$ represents the set of states sent by Alice (A) using the invariant basis and $Z_B$ represents the set of states measured at Bob (B) using the invariant basis, if $X_A$ represents the set of states sent by Alice (A) using the one of the other non-invariant basis and $X_B$ represents the set of states measured at Bob (B) using the same other non-invariant basis, if $Y_A$ represents the set of states sent by Alice (A) using the other non-invariant basis and $Y_B$ represents the set of states measured at Bob (B) using the same other non-invariant basis, then the apparatus 2 determines C where $$C = <X_A X_B>^2 + <X_A Y_B>^2 + <Y_A X_B>^2 + <Y_A Y_B>^2$$

The remote apparatus 20 is also configured to identify a match when a common basis is used for creating, at the apparatus 2, a quantum optical output signal and for measuring, at the remote apparatus 20, the created quantum optical output signal 9.

The remote apparatus may, for example, measure the state S the created quantum optical output signal 9 using a polarization controller for randomly selecting the basis B, a polarizing beam splitter and two parallel single photon detectors for detecting the state. The single photon detectors may be, for example, cooled Avalanche photodiode in Geiger mode (e.g. InGaAs) or superconducting single photon detectors (e.g. NbN nanowires).

The remote apparatus 20 is additionally configured to identify when a match is an invariant match. An invariant match occurs when a common invariant basis is used for creating, at the apparatus 2, a quantum optical output signal 9 and for measuring, at the remote apparatus 20, the created quantum optical output signal 9.

The remote apparatus 20 is configured, when there is an invariant match, to record as a first information bit, the state S of the common invariant basis used to measure that matched quantum optical output signal 9. The first information bits are the bits a distributed shared quantum key.

The remote apparatus 20 is configured to record, as a second information bits, the state S of the non-invariant bases used to measure the optical output signals 9. The second information bits are used to calculate a statistical expression that estimates security.

For example, if $Z_A$ represents the set of states sent by Alice (A) using the invariant basis and $Z_B$ represents the set of states measured at Bob (B) using the invariant basis, if $X_A$ represents the set of states sent by Alice (A) using the one of the other non-invariant basis and $X_B$ represents the set of states measured at Bob (B) using the same other non-invariant basis, if $Y_A$ represents the set of states sent by Alice (A) using the other non-invariant basis and $Y_B$ represents the set of states measured at Bob (B) using the same other non-invariant basis, then the remote apparatus 20 determines C where $$C = <X_A X_B>^2 + <X_A Y_B>^2 + <Y_A X_B>^2 + <Y_A Y_B>^2$$

In this way a quantum key is distributed from apparatus 2 (Alice) to the remote apparatus 20 (Bob).

The output optical interface 10 may be configured to release the quantum communication channel 30 after quantum key distribution.

The apparatus 2 may be a mobile apparatus. The apparatus 2 may be a mobile apparatus such as a mobile computer e.g. a lap-top or tablet computer or may be a hand-portable personal electronic device, that is sized to fit in a shirt pocket such as a cellular telephone or similar.

The apparatus 2 may be a module for an electronic apparatus. For example, the input optical interface 4, the encoder 6, the attenuator 8 and the output optical interface may be integrated in a single module such as a chip. The module may, or may not, additionally comprise the communications interface 12 and/or the processor 14 and/or the memory 16. It may comprise a secure memory for storing a distributed quantum key.

The shared quantum key may be securely stored in a tamper-proof repository or similar secure memory at the apparatus 2 until it is needed, for example, for message encryption. The secure memory may be, for example, a secure memory used for storing communication secrets. It may for example be a secure memory of a smart card such as a subscriber identity module (SIM) or user identity module (UIM) or similar. Summing the quantum key with a message bitwise (modulo 2) produces an encrypted message.

The remote apparatus 20 may comprise: a coherent light source 22; an intensity modulator 24 configured to receive an output from the coherent light source and produce a series of optical signals 3; an interface 26 configured to receive the series of optical signals 3 without modification by a quantum state encoder and provide the series of optical signals 3 to an apparatus 2 via an optical fiber 40 for quantum encoding; and circuitry 28 configured to measure states S of quantum encoded optical signals 9 received in response to the series of optical signals 3 via a quantum communications channel 39 from the apparatus 2.

Figure 3:
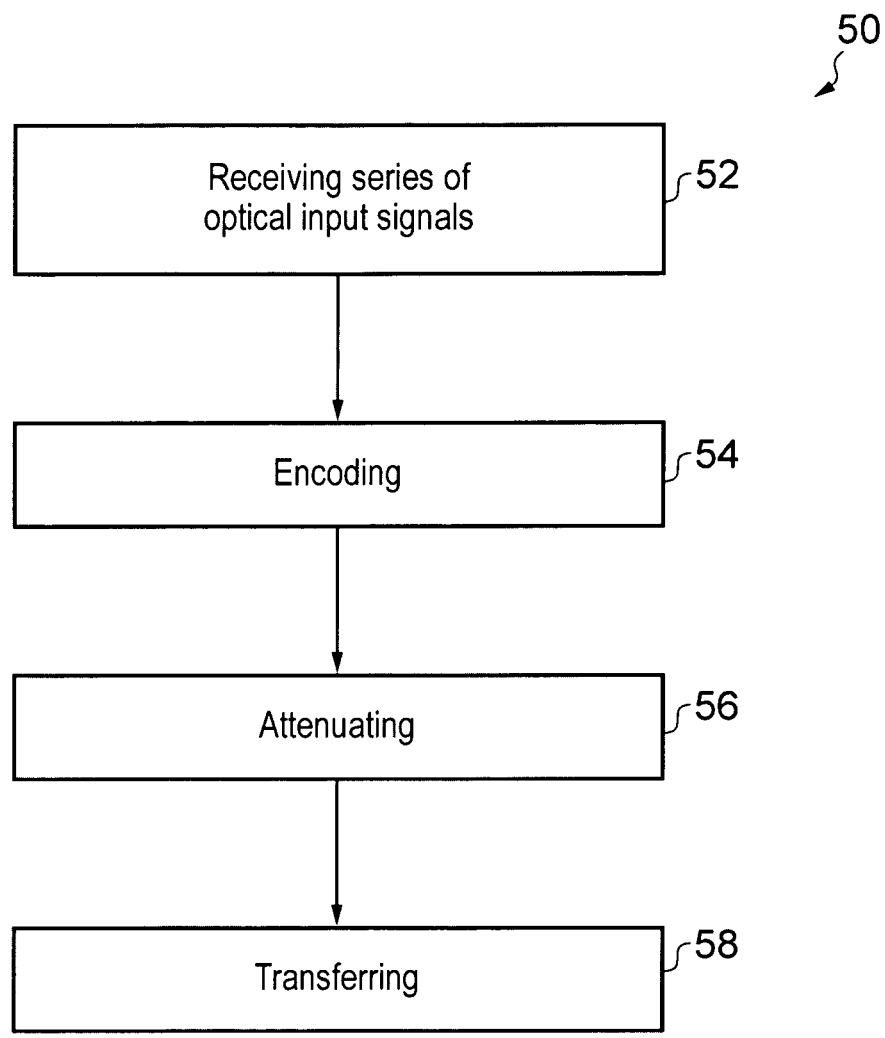
FIG. 3 illustrates a method of transferring a quantum key.

FIG. 3 illustrates a method of quantum key distribution. This method has already been described with reference to FIGS. 1 and 2 but is illustrated separately as a flow diagram in FIG. 3.

The method 50 comprises blocks 52, 54, 56, 58.

At block 52, a series of optical input signals 3 is received by Alice (apparatus 2). Each optical input signal comprises multiple photons.

At block 54, Alice (apparatus 2) encodes a quantum key for distribution. This is achieved by encoding each of the series of received optical input signals 3 with a measurable state S to produce a series of encoded optical input signals 7.

At block 56, Alice (apparatus 2) attenuates each of the encoded optical input signals 7 to create a series of quantum optical signals 9.

At block 58, Alice (apparatus 2) transfers the series of quantum optical signals 9 to a remote apparatus 20 via a quantum communication channel 30.

The series of quantum optical signals 9 may be transferred to the remote apparatus 20 via a user releasable optical fiber which is released after quantum key distribution to enable the apparatus 2 to be mobile. The optical fiber may be a polarization maintaining optical fiber. The polarization maintaining optical fiber may comprise equal lengths of optical fiber having orthogonal fast axes.

Although embodiments of the present invention have been described in the preceding paragraphs with reference to various examples, it should be appreciated that modifications to the examples given can be made without departing from the scope of the invention as claimed.

Implementation of a processor can be in hardware alone (a circuit, a microprocessor . . . ), have certain aspects in software including firmware alone or can be a combination of hardware and software (including firmware).

The processor may be implemented using instructions that enable hardware functionality, for example, by using executable computer program instructions in a general-purpose or special-purpose microprocessor that may be stored on a computer readable storage medium (disk, memory etc) to be executed by such a microprocessor.

As used here 'module' refers to a unit or apparatus that excludes certain parts/components that would be added by an end manufacturer or a user.

The output interfaces 10 and the input interfaces 4 illustrated in FIGS. 1 and 2, may in a practical implementation comprise a band pass filter set for the frequency of the input signals 3 (from the laser 22 in FIG. 2). The band pass may, for example, be set at 1550 nm.

The input interface 4 may additionally comprise circuitry for detecting an external probing (Trojan) hack via the input interface 4. The input interface 4 may, for example, comprise an optical beam splitter that directs one beam of light towards the encoder and another beam of light to a simple diode detector. The output of the diode detector may provide an input to the processor 14. The simple diode detector can be used to detect probing (Trojan) hacks by Eve via the input interface 4.

The output interface 10 may additionally comprise circuitry for detecting an external probing (Trojan) hack via the output interface 10. The output interface 10 may, for example, comprise an optical beam splitter that directs a beam of light received at the output interface towards a simple diode detector. The output of the diode detector may provide an input to the processor 14. The simple diode detector can be used to detect external probing (Trojan) hacks by Eve via the output interface 10. Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. An apparatus comprising:
 an input optical interface configured to receive from a source external to the apparatus a series of optical input signals each comprising photons;
 an encoder configured to encode a quantum key for distribution by encoding at least one of the received optical input signals, from the series of received optical input signals, with a measurable state;
 an attenuator configured to attenuate each of the at least one encoded optical input signals to create a series of quantum optical signals; and
 an output optical interface configured to send the series of quantum optical signals to a remote apparatus via a quantum communication channel, wherein the output optical interface is configured to release the quantum communication channel after quantum key distribution.

2. The apparatus as claimed in claim 1, wherein the encoder is configured to randomly select one of a plurality of conjugate bases, each of which defines two orthogonal states and is configured to randomly select one of the two orthogonal states of the selected conjugate base, and is configured to apply the selected state to an optical input signal.

3. The apparatus as claimed in claim 1, wherein the encoder is configured to control a polarization state of the optical input signal.

4. The apparatus as claimed in claim 3, wherein a polarization state is a state defined according to one of the following bases: the rectilinear basis of vertical) (0° and horizontal (90°), the diagonal basis of 45° and 135° and the circular basis of left- and right-handedness.

5. The apparatus as claimed in claim 1, wherein the series of optical input signals is received from the remote apparatus.

6. The apparatus as claimed in claim 1, wherein the attenuator is configured so that the quantum output optical signal probabilistically comprises a single photon.

7. The apparatus as claimed in claim 1, wherein the quantum communication channel is associated with one or more invariant bases such that the quantum communication channel preserves states of the invariant basis and wherein a state of the optical input signal is defined according to any one of a plurality of bases including the one or more invariant bases.

8. The apparatus as claimed in claim 1, wherein the optical output interface is configured to be releasably connected to a polarization maintaining optical fiber.

9. The apparatus as claimed in claim 8, wherein the polarization maintaining optical fiber comprises equal lengths of optical fiber having orthogonal fast axes.

10. The apparatus as claimed in claim 1, further comprising a communication interface for communication with the remote apparatus
 wherein the communication interface is configured to transmit information to the remote apparatus that identifies a basis for states of quantum optical signals in the series of quantum optical signals, and wherein the communication interface is configured to receive information from the remote apparatus that identifies a basis used to measure quantum optical signals in the series of quantum optical signals.

11. The apparatus as claimed in claim 1, further comprising a processor configured to identify a match when a common basis is used for creating, at the apparatus, a quantum optical output signal and for measuring, at the remote apparatus, the created quantum optical output signal wherein the processor is configured:
 to identify an invariant match when a common invariant basis is used for creating, at the apparatus, a quantum optical output signal and for measuring, at the remote apparatus, the created quantum optical output signal;
 to record, when there is an invariant match, information identifying which state of the common basis was used for creating the quantum optical output signal as an information bit of a security key; and
 to record information identifying which states of non-invariant bases were used for creating the quantum optical output signal as information bits for calculating a statistical expression to estimate security.

12. The apparatus as claimed in claim 1, comprised within a module for an electronic device or comprised within an electronic device.

13. The quantum key distribution system comprising:
an apparatus as claimed in claim 1; and
an optical quantum communication channel releasably connected to the optical output interface of the apparatus and to the remote apparatus.

14. The apparatus as claimed in claim 1, wherein the input optical interface is configured to receive the series of optical input signals from the remote apparatus as the source external to the apparatus.

15. A method comprising:
receiving a series of optical input signals from an external source, each of the optical input signals comprising photons;
encoding a quantum key for distribution by encoding at least one of the received optical input signals, from the series of received optical input signals, with a measurable state;
attenuating each of the at least one encoded optical input signals to create a series of quantum optical signals; and
transferring the series of quantum optical signals to a remote apparatus via a quantum communication channel, wherein the quantum communication channel is user released after quantum key distribution.

16. The method as claimed in claim 15, wherein the series of quantum optical signals are transferred to a remote apparatus via a quantum communication channel via a user releasable polarization maintaining optical fiber.

17. The method as claimed in claim 16, wherein the polarization maintaining optical fiber comprises equal lengths of optical fiber having orthogonal fast axes.

18. An apparatus comprising:
a coherent light source;
an intensity modulator configured to receive an output from the coherent light source and produce a series of optical signals, wherein said output from the coherent light source comprises a plurality of photons and not single level photon level pulses;
an interface configured to receive the series of optical signals without modification by a quantum state encoder and provide the series of optical signals to an apparatus via an optical fiber; and
circuitry configured to measure states of quantum encoded optical signals received in response to the series of optical signals via a quantum communications channel from the apparatus.

19. The apparatus as claimed in claim 18, wherein the series of optical signals are provided to a remote apparatus and the quantum encoded optical signals are received from the remote apparatus.

* * * * *